United States Patent
Staats

(10) Patent No.: US 6,829,225 B2
(45) Date of Patent: *Dec. 7, 2004

(54) METHOD FOR COMPUTING SPEED MAP FOR IEEE-1394 NETWORK

(75) Inventor: Erik P. Staats, Ben Lomand, CA (US)

(73) Assignee: Apple Computer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 614 days.

(21) Appl. No.: 09/027,400

(22) Filed: Feb. 20, 1998

(65) Prior Publication Data

US 2002/0057655 A1 May 16, 2002

(51) Int. Cl.[7] .................................................. H04J 3/14
(52) U.S. Cl. ....................................................... 370/255
(58) Field of Search ................................. 370/255, 256

(56) References Cited

U.S. PATENT DOCUMENTS

| | | | |
|---|---|---|---|
| 5,504,757 A | | 4/1996 | Cook et al. .................... 370/84 |
| 6,160,796 A | * | 12/2000 | Zou ........................... 370/257 |
| 6,185,622 B1 | * | 2/2001 | Sato ........................... 709/233 |

OTHER PUBLICATIONS

"P1394 Standard For A High Performance Serial Bus", *The Institute of Electrical and Electronic Engineers, Inc., IEEE Standards Department*, P1394 Draft 8.0v3, pp. 1–394 (Oct. 16, 1995).

* cited by examiner

*Primary Examiner*—Melvin Marcelo
(74) *Attorney, Agent, or Firm*—Blakely, Sokoloff, Taylor & Zafman LLP

(57) ABSTRACT

Within a digital network having a bus architecture that complies with the IEEE-1394 Standard for a High Performance Serial Bus a speed map for the digital network is computed by first, computing a first speed between a first node and a second node of the digital network; and second, computing a second speed between the first node and a third node of the digital network using the computed first speed.

18 Claims, 4 Drawing Sheets

| | CPU NODE 12 | HARD DRIVE NODE 15 | KEYBOARD NODE 40 | MOUSE NODE 44 | MONITOR NODE 16 | PRINTER NODE 24 | VCR NODE 34 | VIDEO CAMERA NODE 30 |
|---|---|---|---|---|---|---|---|---|
| CPU NODE 12 | X | 200 | 200 | 100 | 200 | 100 | 100 | 200 |
| HARD DRIVE NODE 15 | 200 | X | 200 | 100 | 200 | 100 | 100 | 200 |
| KEYBOARD NODE 40 | 200 | 200 | X | 100 | 200 | 100 | 100 | 200 |
| MOUSE NODE 44 | 100 | 100 | 100 | X | 100 | 100 | 100 | 100 |
| MONITOR NODE 16 | 200 | 200 | 200 | 100 | X | 100 | 100 | 200 |
| PRINTER NODE 24 | 100 | 100 | 100 | 100 | 100 | X | 100 | 100 |
| VCR NODE 34 | 100 | 100 | 100 | 100 | 100 | 100 | X | 100 |
| VIDEO CAMERA NODE 30 | 200 | 200 | 200 | 100 | 200 | 100 | 100 | X |

|    | Ø   | 1   | 2   | 3   | 4   | 5   | 6   | 7   | 8   | 9   | 10  |
|----|-----|-----|-----|-----|-----|-----|-----|-----|-----|-----|-----|
| Ø  | X   | 100 | 200 | 200 | 200 | 100 | 100 | 100 | 100 | 100 | 100 |
| 1  | 100 | X   | 100 | 100 | 100 | 100 | 100 | 100 | 100 | 100 | 100 |
| 2  | 200 | 100 | X   | 200 | 200 | 100 | 100 | 100 | 100 | 100 | 100 |
| 3  | 200 | 100 | 200 | X   | 200 | 100 | 100 | 100 | 100 | 100 | 100 |
| 4  | 200 | 100 | 200 | 200 | X   | 100 | 100 | 100 | 100 | 100 | 100 |
| 5  | 100 | 100 | 100 | 100 | 100 | X   | 100 | 100 | 100 | 100 | 100 |
| 6  | 100 | 100 | 100 | 100 | 100 | 100 | X   | 100 | 100 | 100 | 100 |
| 7  | 100 | 100 | 100 | 100 | 100 | 100 | 100 | X   | 200 | 200 | 100 |
| 8  | 100 | 100 | 100 | 100 | 100 | 100 | 100 | 200 | X   | 200 | 100 |
| 9  | 100 | 100 | 100 | 100 | 100 | 100 | 100 | 200 | 200 | X   | 100 |
| 10 | 100 | 100 | 100 | 100 | 100 | 100 | 100 | 100 | 100 | 100 | X   |

|  | CPU NODE 12 | HARD DRIVE NODE 15 | KEYBOARD NODE 40 | MOUSE NODE 44 | MONITOR NODE 16 | PRINTER NODE 24 | VCR NODE 34 | VIDEO CAMERA NODE 30 |
|---|---|---|---|---|---|---|---|---|
| CPU NODE 12 | X | 200 | 200 | 100 | 200 | 100 | 100 | 200 |
| HARD DRIVE NODE 15 | 200 | X | 200 | 100 | 200 | 100 | 100 | 200 |
| KEYBOARD NODE 40 | 200 | 200 | X | 100 | 200 | 100 | 100 | 200 |
| MOUSE NODE 44 | 100 | 100 | 100 | X | 100 | 100 | 100 | 100 |
| MONITOR NODE 16 | 200 | 200 | 200 | 100 | X | 100 | 100 | 200 |
| PRINTER NODE 24 | 100 | 100 | 100 | 100 | 100 | X | 100 | 100 |
| VCR NODE 34 | 100 | 100 | 100 | 100 | 100 | 100 | X | 100 |
| VIDEO CAMERA NODE 30 | 200 | 200 | 200 | 100 | 200 | 100 | 100 | X |

FIG. 5

METHOD FOR COMPUTING SPEED MAP FOR IEEE-1394 NETWORK

FIELD OF THE INVENTION

This invention relates generally to data communications and, more particularly, to a method for controlling isochronous data communications within a digital system having a bus architecture that complies with the IEEE-1394 Standard for a High Performance Serial Bus.

BACKGROUND

The components of a computer or other digital system are typically coupled to a common bus for communicating information to one another. Various bus architectures are known in the prior art, and each bus architecture operates according to a communications protocol that defines the manner in which data transfer between components is accomplished.

The Institute of Electrical and Electronic Engineers (IEEE) has promulgated a number of different bus architecture standards including IEEE standards document 1394, entitled *Standard for a High Performance Serial Bus* (hereinafter "IEEE-1394 Serial Bus Standard"). A typical serial bus having the IEEE-1394 standard architecture is comprised of a multiplicity of nodes that are interconnected via point-to-point links, such as cables, that each connect a single node of the serial bus to another node of the serial bus. Data packets are propagated throughout the serial bus using a number of point-to-point transactions, wherein a node that receives a packet from another node via a first point-to-point link retransmits the received packet via other point-to-point links. A tree network configuration made up of one root and several parent and child nodes, and an associated packet handling protocol ensures that each node receives every packet once. The serial bus of the IEEE-1394 Serial Bus Standard may be used as an alternate bus for the parallel backplane of a computer system, as a low cost peripheral bus, or as a bus bridge between architecturally compatible buses.

The IEEE-1394 Serial Bus supports multiple data rates, for example, 98.304 Mbit/s (referred to as the "base rate"), 196.608 Mbit/s and 393.216 Mbit/s (hereafter referred to as 100, 200 and 400 Mbit/s, respectively). During start up, each node of a network configured in accordance with the IEEE-1394 Serial Bus Standard broadcasts its speed capabilities as part of a node self-identification transmission. In addition, each higher speed node (i.e., those capable of data rates in excess of the base rate) exchanges speed information with its parent at the end of the node self-identification process. In this way, each node is provided with a complete record of the speed capabilities of the nodes attached to each of its connected ports.

During normal packet transmission, a speed code is sent by a node as part of a bus arbitration phase. If a directly attached node is incapable of receiving high speed data, then it is not sent any clocked data. Instead, a data prefix is continually sent by the node accessing the bus to the slower speed node, until the higher speed node has completed sending the packet on its remaining ports. This keeps the slower attached node from arbitrating while the high speed data is sent out of the other port(s). Since the slower node propagates the data prefix to all of its other ports, all devices down stream from that node will also be kept from arbitrating.

Although this process (which is described in detail in the IEEE-1394 Serial Bus Standard) ensures that all nodes will arbitrate correctly, it is still possible for slower nodes to act as blocking points for higher speed packets. To prevent this, the initiator of a packet needs to know the speed capabilities of the nodes along the path between it and a responding node. On a fully managed bus, this information is available in the form of a speed map published by the bus manager based on data gathered from the node self-identification phase. According to the IEEE 1394 Serial Bus Standard, the speed map is an array of vectors, where each vector entry indicates the maximum data transfer rate supported between two nodes. The IEEE 1394 Serial Bus Standard specifies a format for a SPEED_MAP register but does not specify how the bus manager is to compute the vector entries for the speed map.

One prior scheme for computing the vector entries for the speed map requires that each path between nodes be traversed to determine the maximum possible transmission speed between any two nodes. To illustrate, consider the digital network illustrated in FIG. 1. Digital network 100 includes 11 nodes (0–10) interconnected via point-to-point links in a tree fashion according to the IEEE Serial Bus Standard. Each node (0–10) has an associated maximum transmission speed which in FIG. 1 is indicated in parenthesis next to the node number. The above convention where 100 represents a 98.304 Mbit/s capable node and 200 represents a 196.608 Mbit/s capable node is used here for convenience. To compute the maximum transmission speed between any two nodes, for example node 0 and node 4, the prior scheme computes:

max speed 0→4=MIN(speed 0, speed 4)=200 Mbit/s.

Then, to compute the maximum speed between nodes 0 and 1, max speed 0→1=MIN(speed 0, speed 4, speed 3, speed 1)=100 Mbit/s.

In other words, for each node pair, this scheme always traverses the entire network path between the nodes of the pair to compute the maximum transmission speed. When all such paths for each node pair have been computed, a matrix such as the one shown in FIG. 2 may be generated (of course the actual speed map stored by the bus manager will comply with the format shown in the IEEE 1394 Serial Bus Standard).

This scheme for computing speed map vector entries consumes a significant amount of time, especially when there are a large number of nodes in the digital system. Accordingly, a new method for computing the speed map vector entries is needed.

SUMMARY OF THE INVENTION

Within a digital network having a bus architecture that complies with the IEEE-1394 Standard for a High Performance Serial Bus a speed map for the digital network is computed by first, computing a first speed between a first node and a second node of the digital network; and second, computing a second speed between the first node and a third node of the digital network using the computed first speed.

BRIEF DESCRIPTION OF THE DRAWINGS

The present invention is illustrated by way of example and not limitation in the figures of the accompanying drawings, in which like references indicate similar elements and in which:

FIG. 5 illustrates a speed map matrix for the digital system of FIG. 4.

DETAILED DESCRIPTION

Figures 1, 2:
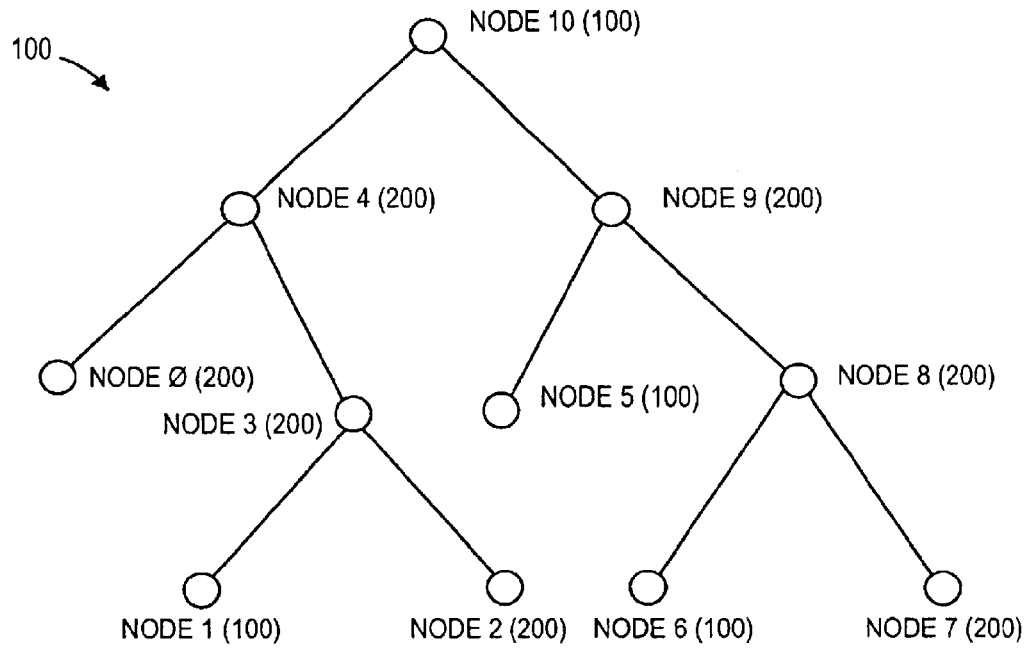
FIG. 1 illustrates a digital system having a serial bus made up of a number of nodes and supporting the computation of a speed map according to a conventional scheme.
FIG. 2 illustrates a speed map matrix for the digital system of FIG. 1.
Figure 3:
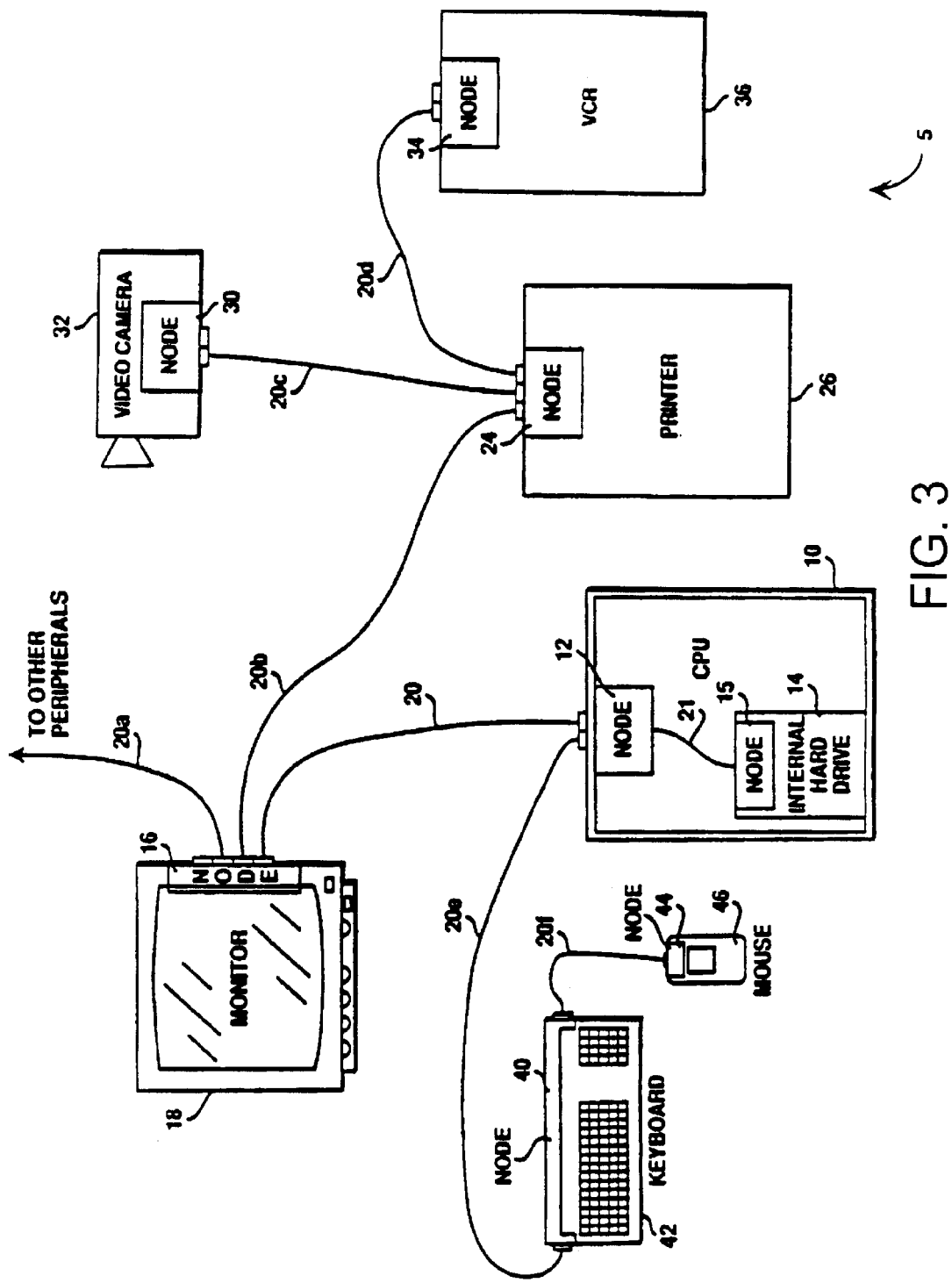
FIG. 3 illustrates a digital system configured to compute speed map entries in accordance with one embodiment of the present invention.

As described herein, methods for computing a speed map for a digital system having a bus architecture that complies with the IEEE-1394 Standard for a High Performance Serial Bus are provided. For example, FIG. 3 shows an exemplary digital system 5 utilizing the methods of the present invention. As will be described in detail below, in one embodiment a speed map for the digital network is computed by first, computing a first speed between a first node and a second node of the digital network; and second, computing a second speed between the first node and a third node of the digital network using the computed first speed.

Some portions of the detailed description which follows are presented in terms of data structures, algorithms and symbolic representations of operations on data within a computer network and/or a computer memory. These descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical and/or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying", or the like, refer to the actions and processes of a computer or other digital system that manipulates and transforms data represented as physical (electronic) quantities within the computer system's registers and memories into other data similarly represented as physical quantities within the computer system memories or registers or other such information storage, transmission or display devices.

The digital system 5 of FIG. 3 includes a central processing unit (CPU) 10, a monitor 18, a printer 26, a video camera 32, a video cassette recorder (VCR) 36, a keyboard 42, and a mouse 46. The CPU 10 includes an internal hard drive 14 and a memory (not shown). Each of the devices of digital system 5 is coupled to a local node of the serial bus. In general, the device to which a node is coupled acts as the "local host" for that node. For example, the CPU 10 is the local host for the CPU node 12; the monitor 18 is the local host for the monitor node 16; the printer 26 is the local host for the printer node 24; the video camera 32 is the local host for the video camera node 30; the VCR 36 is the local host for the VCR node 34; the keyboard 42 is the local host for the keyboard node 40; the mouse 46 is the local host for the mouse node 44; and the internal hard drive 14 is the local host for the internal hard drive node 15. Those skilled in the art will appreciate that it is not always necessary for every node to have a local host, nor is it necessary that a local host always be powered.

A point-to-point link such as cable 20 is used to connect two nodes to one another. CPU node 12 is coupled to internal hard drive node 15 by an internal link 21, to monitor node 16 by cable 20, and to keyboard node 40 by a cable 20e. The keyboard node 40 is coupled to the mouse node 44 by a cable 20f. The monitor node 16 is coupled to the nodes of the other peripherals (not shown) by cable 20a and to the printer node 24 by cable 20b. The printer node 24 is coupled to the video camera node 30 by cable 20c and to the VCR node 34 by cable 20d. Each of the cables 20–20f and the internal link 21 may be constructed in accordance with the IEEE-1394 Serial Bus Standard and may include a first differential signal pair for conducting a first signal, a second differential signal pair for conducting a second signal, and a pair of power lines.

Each of the nodes 12, 15, 16, 24, 32, 34, 40 and 44 may have identical construction, although some of the nodes, such as mouse node 44, can be simplified because of their specific functions. Thus, the nodes can be modified to meet the needs of a particular local host. For example, each node may have one or more ports, the number of which is dependent upon its needs. For example, CPU node 12, as illustrated, has 3 ports, while the mouse node 44 has only 1 port.

Figure 4:
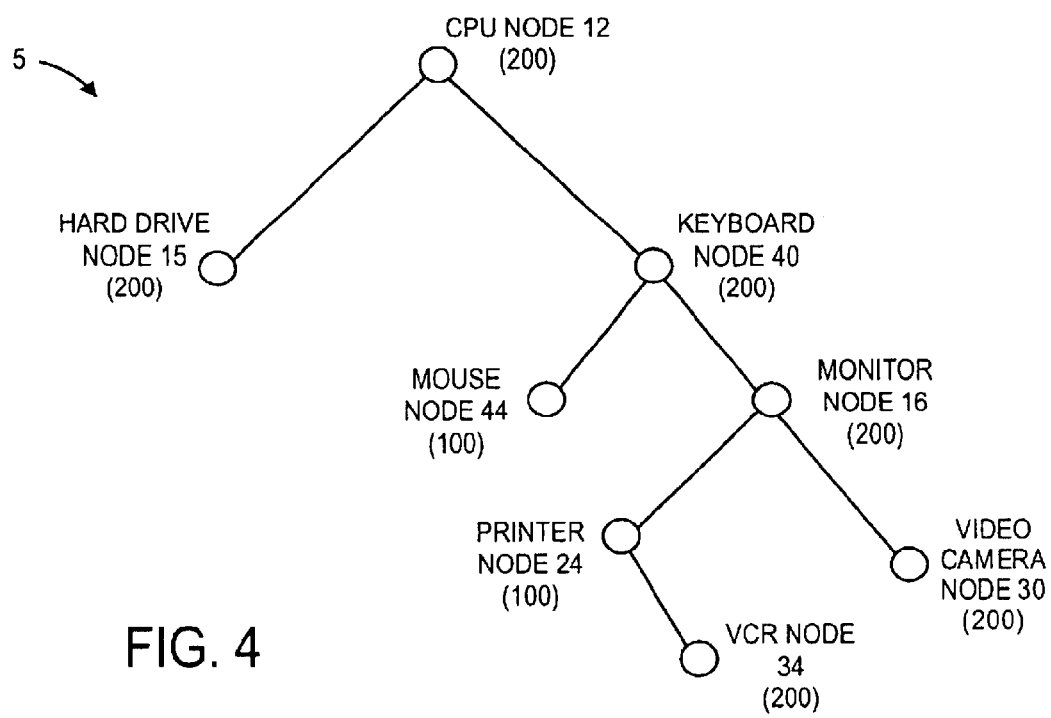
FIG. 4 illustrates the digital system of FIG. 3 in an alternative representation.

Digital system 5 is illustrated in an alternative representation in FIG. 4. Of course, this is only one possible configuration of digital system 5 and other configurations may result upon a bus reset. Other peripherals which may be connected to digital system 5 are not shown in FIG. 4 to simplify the following discussion, however, such peripherals may be present in other embodiments. Also, arbitrary transmission speeds have been assigned to the nodes (in parentheses) of digital system 5 for purposes of explanation and these arbitrary speeds should in no way limit the scope of the present invention.

According to the present invention, the vector entries for a speed map for digital system 5 are computed using a recursive algorithm where previously computed speed values are used to compute a current speed value. For example, the present invention computes:

max speed CPU Node→Keyboard Node=CPU/Keyboard=MIN(speed CPU Node, speed Keyboard Node)=200

Then, the present invention computes:

max speed CPU Node→Mouse Node=*CPU*/Mouse=MIN (CPU/Keyboard, speed Mouse Node)=100

Notice that when computing the maximum speed for transmissions between the CPU node 12 and the Mouse node 44, rather than recomputing for the path between the CPU node 12 and the Keyboard node 42 (which lies along the network path from the CPU node 12 to the Mouse node 44) as in schemes of the past, the present invention makes use of the previously computed CPU/Keyboard speed and then simply takes into account the new portion of the path from the Keyboard node 40 to the Mouse node 44. This has the advantage of greatly speeding up the time required to compute the vector entries for the speed map as each path in the network need only be traversed once. A full speed map matrix computed in this fashion for digital system 5 is shown in FIG. 5 (of course the actual speed map stored by the bus manager will comply with the format shown in the IEEE 1394 Serial Bus Standard).

Thus a method for computing a speed map of a digital system having a bus architecture that complies with the IEEE-1394 Standard for a High Performance Serial Bus has been described. In the foregoing specification, the invention has been described with reference to specific exemplary embodiments thereof. It will, however, be appreciated by those skilled in the art that various modifications and changes may be made thereto without departing from the broader spirit and scope of the invention as set forth in the appended claims. The specification and drawings are accordingly, to be regarded in an illustrative rather than a restrictive sense.

What is claimed is:

1. A method of computing a speed map for a digital network, comprising:

determining whether or not a first speed between a first node and a second node of the digital network is already computed, the second node being on a network path between the first node and a third node of the digital network; and computing a second speed between the first node and the third node of the digital network using the first speed.

2. The method of claim 1 wherein the digital network comprises a network configured in accordance with the IEEE 1394 Standard for a High Performance Serial Bus.

3. The method of claim 1 wherein the digital network comprises a network which has a serial bus.

4. A method as in claim 1 further comprising:

computing the first speed in response to a determination that the first speed is not already computed.

5. A method as in claim 4 wherein said computing the first speed comprises:

determining whether or not a third speed between the first node and a fourth node on the network path is already computed, the fourth node being on the network path between the first node and the third node;

wherein the first speed is computed using the third speed.

6. A method as in claim 1 wherein no node exists between the second node and the third node on the network path.

7. A system for computing a speed map for a digital network, said system comprising:

means for determining whether or not a first speed between a first node and a second node of the digital network is already computed, the second node being on a network path between the first node and a third node of the digital network; and means for computing a second speed between the first node and the third node of the digital network using the first speed.

8. The system of claim 7 wherein the digital network comprises a network configured in accordance with an IEEE 1394 Standard.

9. The system of claim 7 wherein the digital network comprises a network which has a serial bus.

10. A system as in claim 7 further comprising:

means for computing the first speed in response to a determination that the first speed is not already computed.

11. A system as in claim 10 wherein said means for computing the first speed comprises:

means for determining whether or not a third speed between the first node and a fourth node on the network path is already computed, the fourth node being on the network path between the first node and the third node;

wherein the first speed is computed using the third speed.

12. A system as in claim 7 wherein no node exists between the second node and the third node on the network path.

13. A machine readable medium containing executable program instructions which, when executed by a processing system, cause the processing system to perform a method of computing a speed map for a digital network, said method comprising:

determining whether or not a first speed between a first node and a second node of the digital network is already computed, the second node being on a network path between the first node and a third node of the digital network; and computing a second speed between the first node and the third node of the digital network using the first speed.

14. The machine readable medium of claim 13 wherein the digital network comprises a network configured in accordance with an IEEE 1394 Standard.

15. The machine readable medium of claim 13 wherein the digital network comprises a network which has a serial bus.

16. A machine readable medium as in claim 13 wherein said method further comprises:

computing the first speed in response to a determination that the first speed is not already computed.

17. A machine readable medium as in claim 16 wherein said computing the first speed comprises:

determining whether or not a third speed between the first node and a fourth node on the network path is already computed, the fourth node being on the network path between the first node and the third node;

wherein the first speed is computed using the third speed.

18. A machine readable medium as in claim 13 wherein no node exists between the second node and the third node on the network path.

* * * * *